(12) United States Patent
Scott

(10) Patent No.: US 6,247,049 B1
(45) Date of Patent: Jun. 12, 2001

(54) DESIGN OF COMPUTER NETWORKS

(75) Inventor: Derham Leslie Scott, Woodbridge (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/125,379

(22) PCT Filed: Apr. 15, 1998

(86) PCT No.: PCT/GB98/01093

§ 371 Date: Aug. 17, 1998

§ 102(e) Date: Aug. 17, 1998

(87) PCT Pub. No.: WO98/47266

PCT Pub. Date: Oct. 22, 1998

(30) Foreign Application Priority Data

Apr. 15, 1997 (GB) .................................... 9707550

(51) Int. Cl.[7] .................................. G06F 15/177
(52) U.S. Cl. .......................... 709/222; 709/220
(58) Field of Search .................... 709/204, 220, 709/221, 222

(56) References Cited

FOREIGN PATENT DOCUMENTS

| 96/41451 | 12/1996 | (WO) . |
| WO a-96 41451 | 12/1996 | (WO) . |
| 97/01143 | 1/1997 | (WO) . |

OTHER PUBLICATIONS

Fisher M Et Al: "Techniques for Automated Planning of Access Networks" BT Technology Journal, vol. 14, No. 2, Apr., 1996, pp. 121–127.

Ishiwa N Et Al.: An Expert System for Planning Provate Entworks:NEC Research and Development vol. 35, No. 3, Jul., 1994, pp. 306–314.

Daniel Gross: "Applications of AI technology in communication networks" Expert Systems, vol. 5 No. 3, Aug., 1988, pp. 248–251.

Mlsna P A Et Al.: "Nova—An Interactive Network Design Visualization and Optimization Tool" Proceedings of the 1996 IEEE Fifteenth Annual International Phoenix Conference in Computers and Communications, Scottsdale, Mar., 1996 No. Conf. Mar., 1996, Institute of Electrical and Electronics Engineers, pp. 413–419.

Stiffler J A Et Al: "An AI/OR Hybrid Expert System for Data Network Design" Proceedings of the International Conference on Systems, Man, and Cybernetics, Los Angeles, Nov., 1990 No.–Nov., 1990, Institute of Electrical and Electronics Engineers, pp. 307–313.

Mantelman L: "AI Carves Inroads: Network Design, Testing, and Management" Data Communications, vol. 15, No. 8, Jul., 1986, pp. 106–123.

Scott D L Et Al: "A Knowledge–Based System for the Configuration and Pricing of Network Management Systems" pp. 115–131 "Telecommunications Series" 1996.

Mantelman, Al Carves In Roads: Network Design, Testing, and Management' Data Communications, vol. 15, No. 8, Jul. 1986, pp. 106–123.

*Primary Examiner*—Moustafa M. Meky
*Assistant Examiner*—Nkosi N Trim
(74) *Attorney, Agent, or Firm*—Nixon & Vanderhye P.C.

(57) ABSTRACT

A method of designing a computer network makes use of an object-based model enabling elements of the network to be displayed on screen, and manipulated by way of on-screen icons. A predefined rule list, acting directly on the objects, automatically updates the attributes of the objects to complete the network configuration. The rules are preferably Lisp-based, allowing users access to the standard Lisp functions in defining the rules.

21 Claims, 6 Drawing Sheets

DESIGN OF COMPUTER NETWORKS

BACKGROUND OF THE INVENTION

1. Field of the Invention

The present invention relates to a method of configuring computer networks.

2. Related Art

Currently, the design and configuration of computer networks, particularly wide area networks, is a long and complex procedure requiring specialist trained staff. For a complex network, it may take a specialist several weeks to design an appropriate solution for the customer's requirements, and to produce a fully costed recommendation. The customer is often not in a position to give approval until the fully costed recommendation has been received, and if at that stage the customer requests amendments to the design there may be significant delays before the designer can produce a revised proposal. Since each iteration/redesign may take several weeks, it will be understood that the entire process between the initial customer's query and the implementation of the final solution may take some considerable time.

SUMMARY OF THE INVENTION

According to the present invention there is provided a method of configuring a computer network, comprising the steps of:

(a) selecting a plurality of symbol objects, each symbol object being an object-based computer representation, having settable attributes, of a physical element in a computer network;

(b) defining associations between the selected symbol objects to produce an initial network configuration; and (c) applying predefined rules to the selected symbol objects in the initial network configuration, the rules being arranged to alter the settable attributes of the symbol objects dependent upon predefined rule conditions, thereby automatically selecting specific hardware for the physical elements and updating the network configuration;

(d) reapplying the rules to the updated network configuration; and (e) repeating step (d) until the network configuration becomes stable.

The symbol objects are preferably represented by display icons on screen, so that the selection of symbol objects and the defining of associations between objects may be effected by on-screen manipulation of the display icons.

The predefined rules, applied to the current configuration as displayed on screen, may update the object attributes which may in itself alter the on-screen display. This may be repeated for as many passes as may be necessary, until the configuration stablises.

Depending upon the complexity of the rules, the network configuration should rapidly converge to a self-consistent representation which will, by definition, be compatible with the user's requirements. Those user's requirements may be set initially by way of permanent object attributes, with the rules acting only on dynamic object attributes. Alternatively, the user may be permitted to set dynamic attributes manually as well, and a locking mechanism may be provided to prevent the firing of any rules which would alter an attribute that the user wishes to specify as remaining fixed.

In its preferred form, the method allows a model to be constructed which is capable of representing a computer network on several levels, for example both a WAN (Wide Area Network) and the LANs (Local Area Networks) at each physical site of the WAN. The user may set appropriate connections, defining the way in which the LANs talk to the WAN.

The invention in its broadest form further extends to software embodying a method as described above, or as set out in the claims. The invention further extends to a computer-readable media, such as disk or a CD-ROM, carrying such software.

In its preferred form, the present invention links graphics into a knowledge base (an external database), using a rule-based language which can act directly on the object model. Hence, the user can actually control functionality through screen icons. The preferred implementation is in the Lisp language, allowing the user full access to the power of the Common Lisp Object System.

BRIEF DESCRIPTION OF THE DRAWINGS

The invention may be carried into practice in a number of ways and one specific embodiment will now be described, by way of example, with reference to the accompanying drawings in which.

DETAILED DESCRIPTION OF EXEMPLARY EMBODIMENTS

Figure 1:
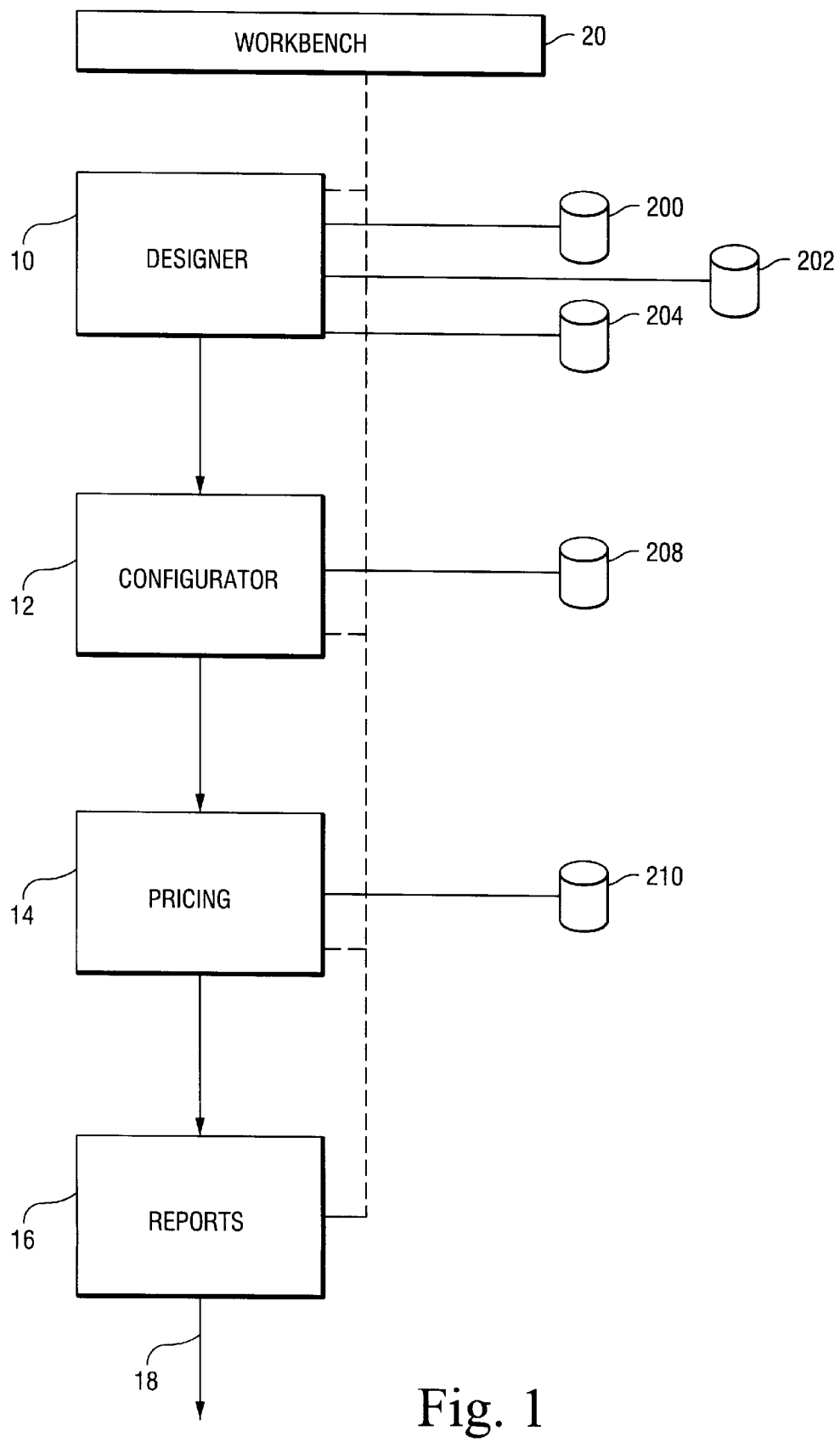
FIG. 1 is a schematic block diagram showing the hardware/software environment within which the method of the present invention may be operated.

FIG. 1 illustrates schematically the hardware/software environment in which the method of the present invention may be operated. The method may conveniently be embodied in software, running on any convenient hardware, such as a Personal Computer.

The preferred software embodiment comprises a designer module 10, a configurator module 12, a pricing module 14 and a reports module 16. Typically, these modules will be used sequentially, so that a user first starts with the designer module 10, which provides for the design of a wide-area network across a number of individual customer sites. The physical locations of the sites on the map may be entered either manually or from a customer-supplied database 200. Alternatively, if the postcodes of the sites can be provided, a postcode look-up database 202 may be used to determine the physical locations. Another possibility is to make use of the telephone numbers of the individual sites, along with a telephone look-up database 204 which, given the telephone number, returns at least the approximate site location. Once the individual site locations have been specified, along with the peak traffic requirements between sites, the designer module 10 will construct a model of the proposed WAN layout, specifying the recommended physical circuits between sites. Further details of the operation of the designer module 10 may be found in our co-pending application, filed Apr. 15, 1997, under application number [attorney's reference P20151GB].

The proposed WAN design is passed onto the configurator module 12 which allows the user to design and configure the individual local area networks that may be needed at each of the sites. Assistance is provided by means of an external knowledge base 208, to be described later, which may conveniently be embodied within a conventional database structure.

The output from the designer and configurator modules is then passed onto the pricing module 14. This includes a pricing engine which uses an external pricing database 210 to provide detailed costings for the wide area and local area networks that have been recommended. The reporting module 16 may provide detailed parts lists, along with corresponding costs. The output at 18 may either be in the form of printed reports, or alternatively may be in electronic format.

A common workbench 20 is provided enabling each of the modules to be operated independently.

The detailed specific embodiment to be described relates primarily to the configurator module 12, and it is to be understood that in its broadest form the invention does not require, as an essential feature, any of the other modules. Although it may be convenient for the designer module to provide the configurator module with the wide-area network design, that is not essential and information on the wide-area network could be provided to the configurator module from elsewhere if necessary. For example, the designer module 10 may not be required at all, if a customer's wide-area network is already in place, and the customer merely requires assistance in designing and configurating local area networks. In addition, the configurator module could be used as a stand-alone application where no links are required into a wide-area network, and only a single local area network is to be provided.

The pricing and reporting modules may use any convenient technology, and may indeed consist of relatively standard components such as known pricing engines, with associated reporting facilities for example by way of spread-sheet or database output.

In its preferred form, the method of the present invention may be embodied within computer software that makes use of an object model of the network that is to be designed. This is shown in more detail in FIG. 8. The object model 300, to be described in more detail below, makes use of an ASCII file 302 which specifies the object classes that will be recognised and their allowable attributes. The objects, or at least some of them, may be displayed and manipulated on screen by way of a graphics module 304. Objects may interact with one another in a multitude of ways, these interactions being controlled by means of a rule engine 306 which makes use of the knowledge base 208. A rule editor 308 is also provided, allowing the user to amend the details in the knowledge base 208 and/or to alter the operation of the rule engine 306.

The object file 302 makes provision for three primary object classes, namely symbol objects, diagram objects and text objects. These will be discussed in more detail below.

Figure 2:
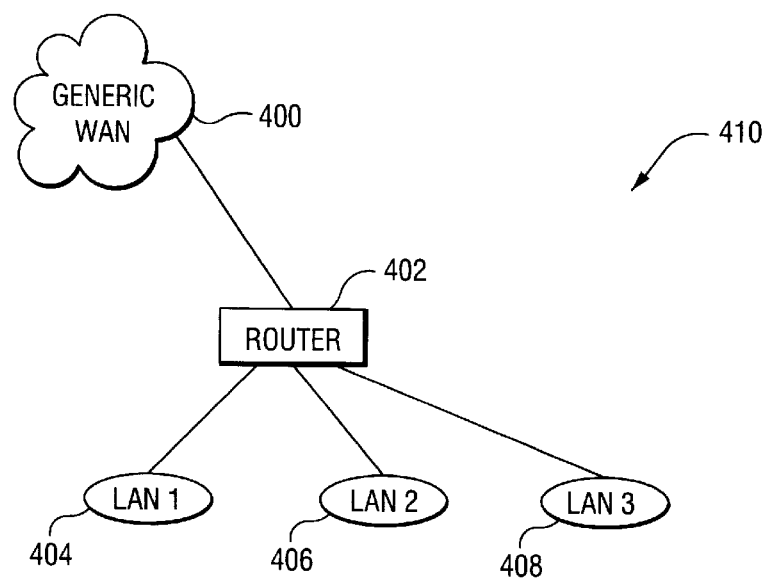
FIGS. 2 and 3 show a typical network being designed.

In operation, the user designs the network by selecting and manipulating icons on a computer screen. A simple example is shown in FIG. 2, in which the user has selected, placed and connected icons representing a generic WAN 400, a generic router 402 and three generic LANs 404,406, 408. Standard drawing tools may be provided to allow the user easily to select the various icons, place them on the screen, and link them together.

Each of the individual items thus chosen is represented internally by a separate symbol object. The attributes of each symbol object specify exactly what is being represented, the icon or "metafile" that is to be displayed on the screen, and the connections to other symbol objects. The entire diagram 410 is represented internally by a diagram object which contains within it each of the individual symbol objects.

Depending upon the application, several different object files 302 may be used, each representative of a different "symbol library". One library might be suitable for designing and configuring one type of network, with another library being more suitable for another type.

Once the generic symbols have been positioned, and the topology of the proposed network specified by means of appropriate links, the user then goes onto the next stage which is to specify some required details for the network. The user simply selects a symbol on screen and enters the appropriate information for that symbol; this sets the attributes for that symbol object.

The system prescribes two main types of attributes that are attached to objects:
1. The permanent attributes, which are user definable but which typically do not change during the configuration process.
2. Dynamic attributes, which are created dynamically due to the firing of rules during the configuration process. Dynamically created attributes always removed (cleared) at the start of each configuration.

Dynamic attributes are useful in ordering a decision-making process into a series of passes. For instance:
1. A router-type may be decided based upon its required connectivity;
2. The router-type together with the protocol to be used may define the Internetworking Operating System (IOS) to be used; and
3. The IOS then determines the amount of memory that will be required in the router.

Step 2 cannot be determined until step 1 is decided, and similarly step 3 requires step 2 to be decided.

Figure 3:
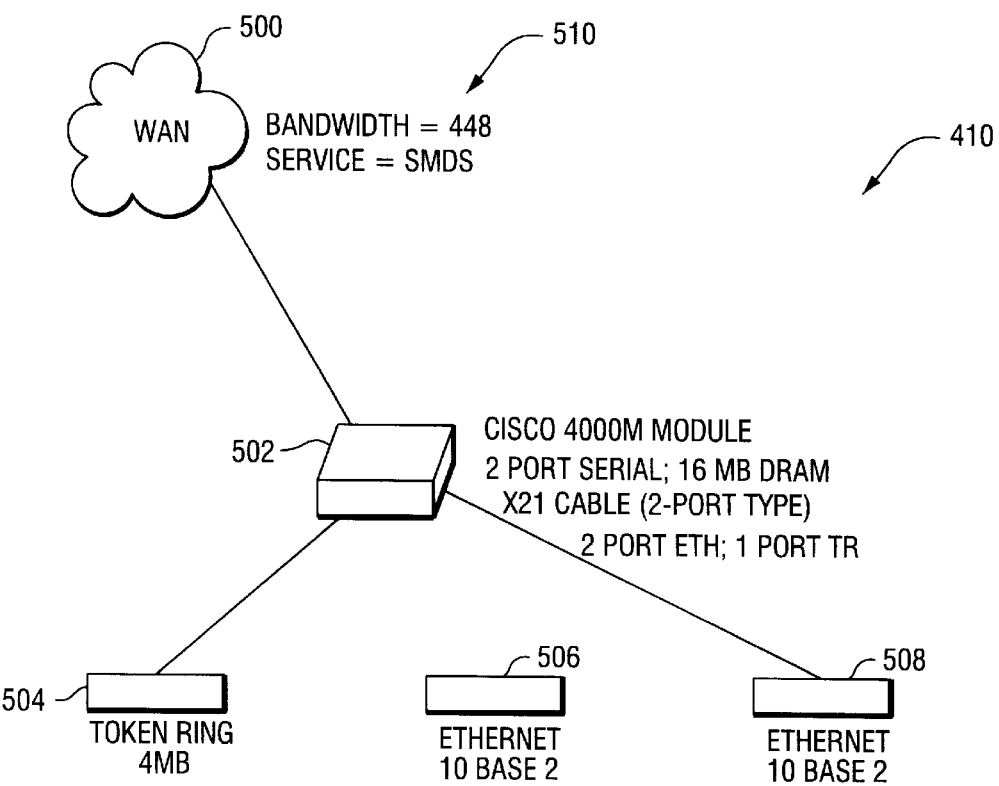

By selecting for example the general WAN symbol 400, the user may wish to specify that the service used is to be SMDS, with a bandwidth of 448. The entered attributes are displayed on screen as a separate text object 510, as shown in FIG. 3, and the generic WAN icon 400 changes to a specified WAN icon 500. Likewise, the user may wish to specify details of the LANs to which the WAN is to be connected; the attributes are shown on screen, as indicated in FIG. 3, and the LAN icons change to the square boxes 504,506,508.

It then remains for the generic router 402 to be determined. Although this may be done manually if desired, the preferred method is to make use of the rule engine to calculate the router attributes dynamically. In operation, the user operates the rule engine by pressing a "GO" button on a toolbar. The rule engine then parses the diagram 410 and applies the appropriate rules from the knowledge base to each of the symbol objects in turn. In the present example, the rules have no affect on the WAN object 500, nor on the LAN objects 504,506,508 since they have already been adequately specified. However, the rules applicable to the router object 402 look at the required connectivity to other objects, and their attributes, to determine exactly which model of router, and peripherals/parts, will be required to satisfy the constraints. Once the rules have been applied, the diagram corresponds to that shown in FIG. 3, with the router icon having changed to indicate a specific router 502. Text next to the icon indicates that the router should be a Cisco 4000 model. The amount of dynamic random access memory is also specified, along with the necessary cards, cables and other necessary attachments.

Having now described a particular example, further details will now be provided of the configuration process itself, in other words the process by which the objects within the current diagram are dynamically updated.

The configuration process uses the rule engine 306 (FIG. 8) which operates by rules which are defined within the knowledge-base library file 208. Each symbol object may have associated with it a set of rules specifying actions to be taken depending on its connectivity with other objects, and the conditions of attributes of the object itself or of the objects to which it is connected.

An example of a rule is as follows:

```
(rule "rulename" (and (option 'supplier' Cisco)
                       (option 'site' small)
                       (connected-to "token ring")
                       (not (connected-to "isdn")))
       (add 'parts "abc")
       (ensure 'parts "xyz"))
```

The condition of the rule tests whether the supplier option is Cisco and the site option is small. It also tests whether the symbol is connected to a token ring symbol but not connected to ISDN. If the condition is true (i.e. all of the sub components of the condition are true) then the current symbol will have an 'abc' component added to the parts attribute, and also an 'xyz' component added if it does not already contain one.

The rule engine 306 is based on an "agenda" or list of rules to be processed. Each rule consists of the name of the rule, followed by a condition and a conclusion; for example, the following rule ensures that if the current object is connected to an object that has a widget, the current object should have a widget as well:

Rule name: Ensure Widget Compatibility
Condition: Connected to object having "widget" attribute
Conclusion: Set "widget" attribute for current object.

The rule engine operates by making an initial pass across the current diagram, visiting each object in turn. Each rule for that object is then tested to determine whether the condition value is true. If the condition returns true, then the rule is stored on the agenda for further use. The diagram is not modified at this time. Once all of the objects have been visited, and the diagram fully parsed, the rule engine passes to the next stage.

On completion of the first stage, the rule engine processes the agenda. Each of the conditions are tested in turn before the conclusion is processed, to ensure that a previously fired rule on the agenda has not invalidated the current rule. If the result of the condition remains true, then the conclusions of the rule are processed. The processing of the conclusions may alter the attributes of the diagram objects which may in turn alter what is displayed to the user on screen. As will have been evident from FIG. 3, the processing may, amongst other things, alter the text objects, thereby allowing the user to see exactly what the system has changed. The icons or metafiles used to display the objects may also change.

Once the agenda has been fully processed, the diagram is parsed once more, and the process is repeated. On the second pass, further changes in attributes may be made, dependent upon changes that were made in the previous pass. The process continues, with repeated passes, until the diagram becomes stable.

It may perhaps be helpful to illustrate how the system operates by means of a worked, generic, example. Reference should be made to FIGS. 4 to 7, which illustrate sequential versions of a diagram showing how the attributes of the diagram objects change as the rules are applied. The initial diagram, shown in FIG. 4, consists of five interlinked generic objects, respectively called P,Q,R,S and T. The object R starts off with the attribute A. No attributes are initially set for any of the other objects.

The three rules that will be applied to this diagram are as follows:
1. Rule name: Rule 1
   Condition: Connected to A
   Conclusion: Ensure B.
2. Rule Name: Rule 2
   Condition: Connected to B
   Conclusion: Ensure C and add B.
3. Rule Name: Rule 3
   Condition: Connected to D and current object has attribute A
   Conclusion: Add X.

Figure 4:
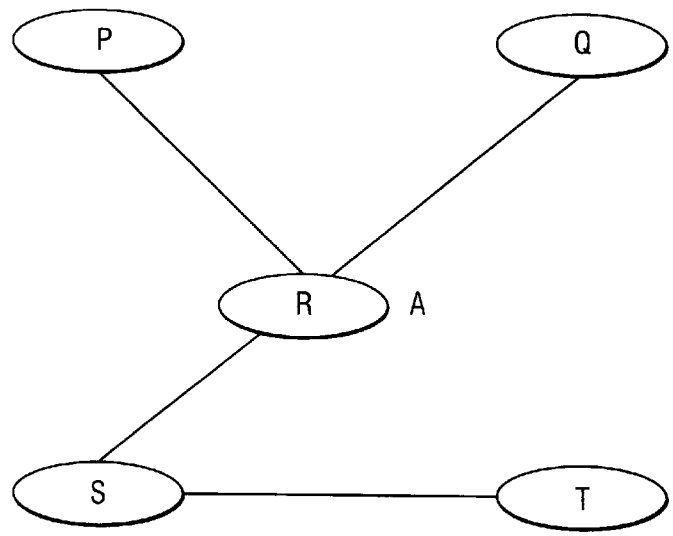
FIGS. 4 to 7 illustrate the operation of an exemplary set of rules.

The rule engine starts by parsing FIG. 4, and visiting each of the objects in turn to determine which of the rule conditions are true. The only relevant rule at this stage is rule 1, and its condition is true for the objects P,Q,S and T. The agenda is therefore created as follows:
1. Object P: Rule 1
2. Object Q: Rule 3
3. Object S: Rule 1
4. Object T: Rule 1

Figure 5:
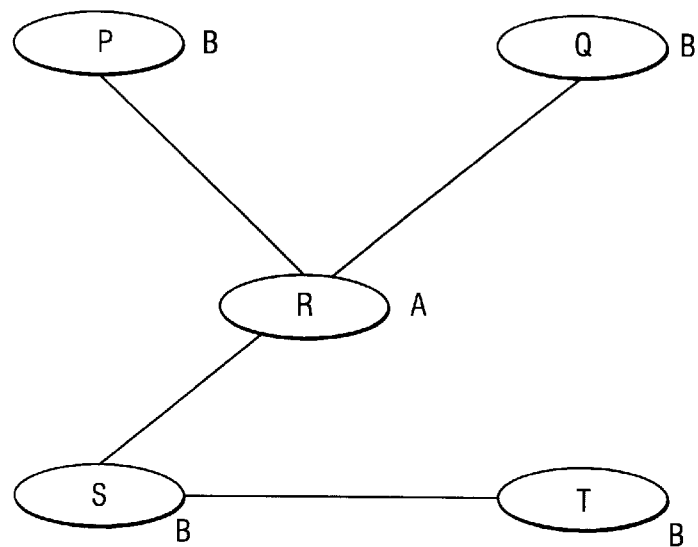

The agenda is now processed sequentially, object-by-object and rule-by-rule. The application of Rule 1 to each of the objects P,Q,S and T results in the attribute B being set for each of those objects, as is shown in FIG. 5. FIG. 5 is then re-parsed by the rule engine, to create a new agenda, and the process is repeated. For simplicity, the parsing of the diagram and the creation of the agenda will henceforth be assumed.

Applying the rules to FIG. 5, it will be seen that since the object R is connected to objects having attribute B, Rule 2 sets the attributes C and D for that object. Likewise, the same rule sets the attributes C and D for objects S and T, since both are connected to an object having the attribute B. No other rules are relevant at this stage, and the diagram accordingly now changes to that shown in FIG. 6.

Figure 6:
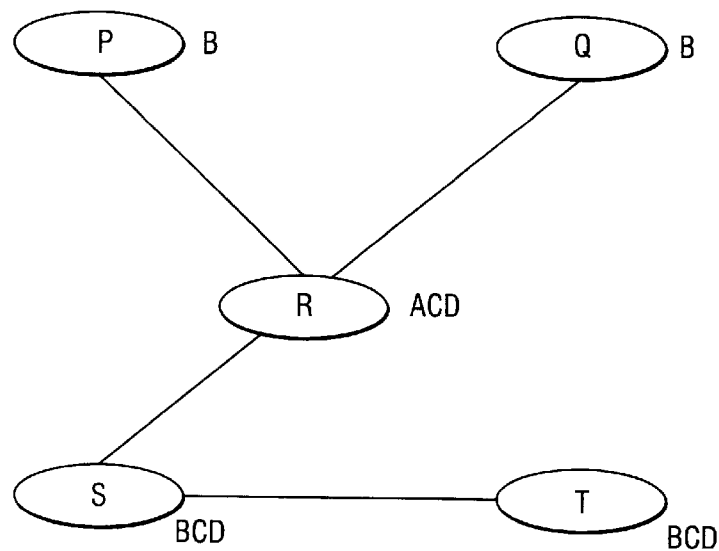
Figure 7:
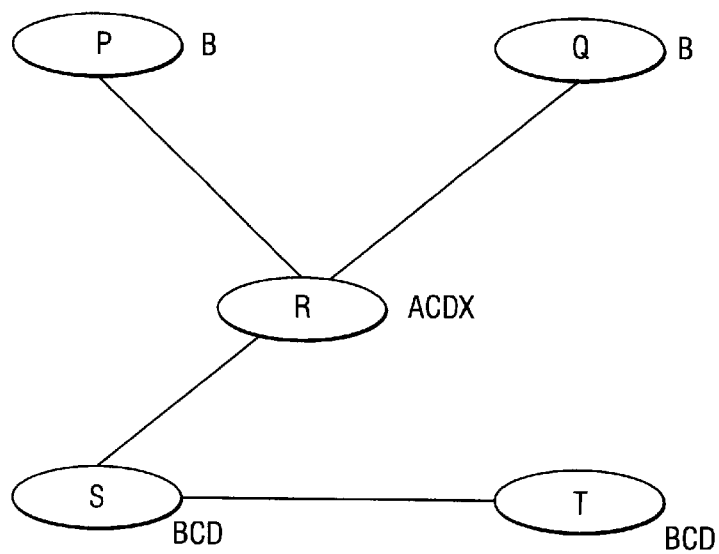

On a parsing of FIG. 6, the rule engine determines that the only applicable rule is rule 3, which applies to object R. Since that object is connected to an object having an attribute D, and since it has itself an attribute A, then a new attribute X needs to be added. The final result is shown in FIG. 7.

Under some circumstances, it may be possible for the knowledge base to define a rule set which causes the rule engine to get stuck in a loop. This could happen, for example, if a conclusion changed an attribute of an object, with the next pass changing it back again. These conflicts can be dealt with either by changing the rules themselves by means of the rule editor 308 (FIG. 8), or alternatively implementing a conflict resolution strategy.

The preferred conflict resolution strategy is to allow the user to specify how the rules on the current agenda are to be processed. The user-selectable options are as follows:
1. Process all of the items on the agenda in a single "forward" pass. This is the default option.
2. Process all of the items on the agenda in a single "reverse" pass.
3. Process the first item on the agenda only, and discard the remainder.

4. Process the last item on the agenda only, and discard the remainder.

Using the last two of the strategies is likely to means that more passes are required before the diagram becomes stable. The discarding of most of the rules in the agenda does not of course necessarily means that those rules will never fire, since any sufficiently important rule which was discarded in one pass is very likely to continue to reappear on subsequent passes until it at last has the opportunity to be processed.

The system in addition keeps a record of all of the rules that have fired for each of the individual objects. To prevent looping, it prevents any rule from firing twice for the same object.

Figure 9:
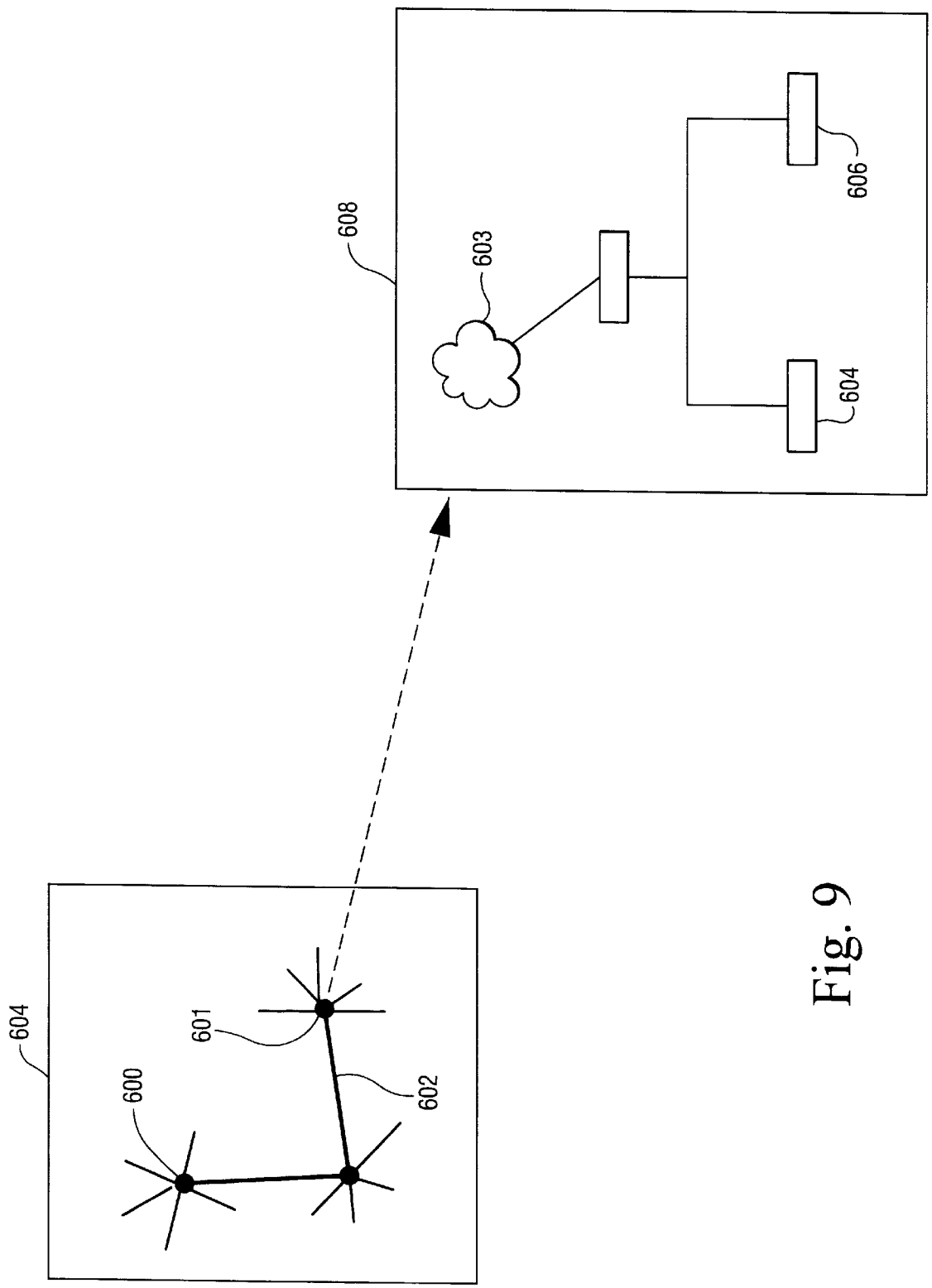
FIG. 9 illustrates how LAN and WAN elements may be linked.

Turning now to FIG. 9, it will be shown how the object model is capable of dealing with the design of a network at various different levels. At the upper level, the model may represent a WAN. This may be displayed on screen as a plurality of physical sites 600 connected by physical circuits 602. Both the sites and the circuits may represent individual objects within the model. All of these objects are contained within a WAN diagram object 604. By clicking on one of the individual site objects 601, the user may "drill down" to display a second screen which shows the LAN contained within that site object. The LAN model includes symbol objects 603,604,606, of the type already discussed with reference to FIGS. 2 and 3. All are contained within a LAN diagram object 608.

The objects themselves either contain attributes which define the linkages between the diagrams, or these linkages are stored in a separate database. For example, the cloud object 603 in the LAN may include an attribute which shows that it links with the core circuit 602 in the WAN.

As mentioned above, the WAN diagram 604 may if desired be supplied externally from the configurator module 12 (FIG. 1). It may for example be supplied as an output of the designer module 10, or alternatively it may be supplied via an exterior database (not shown).

Figure 8:
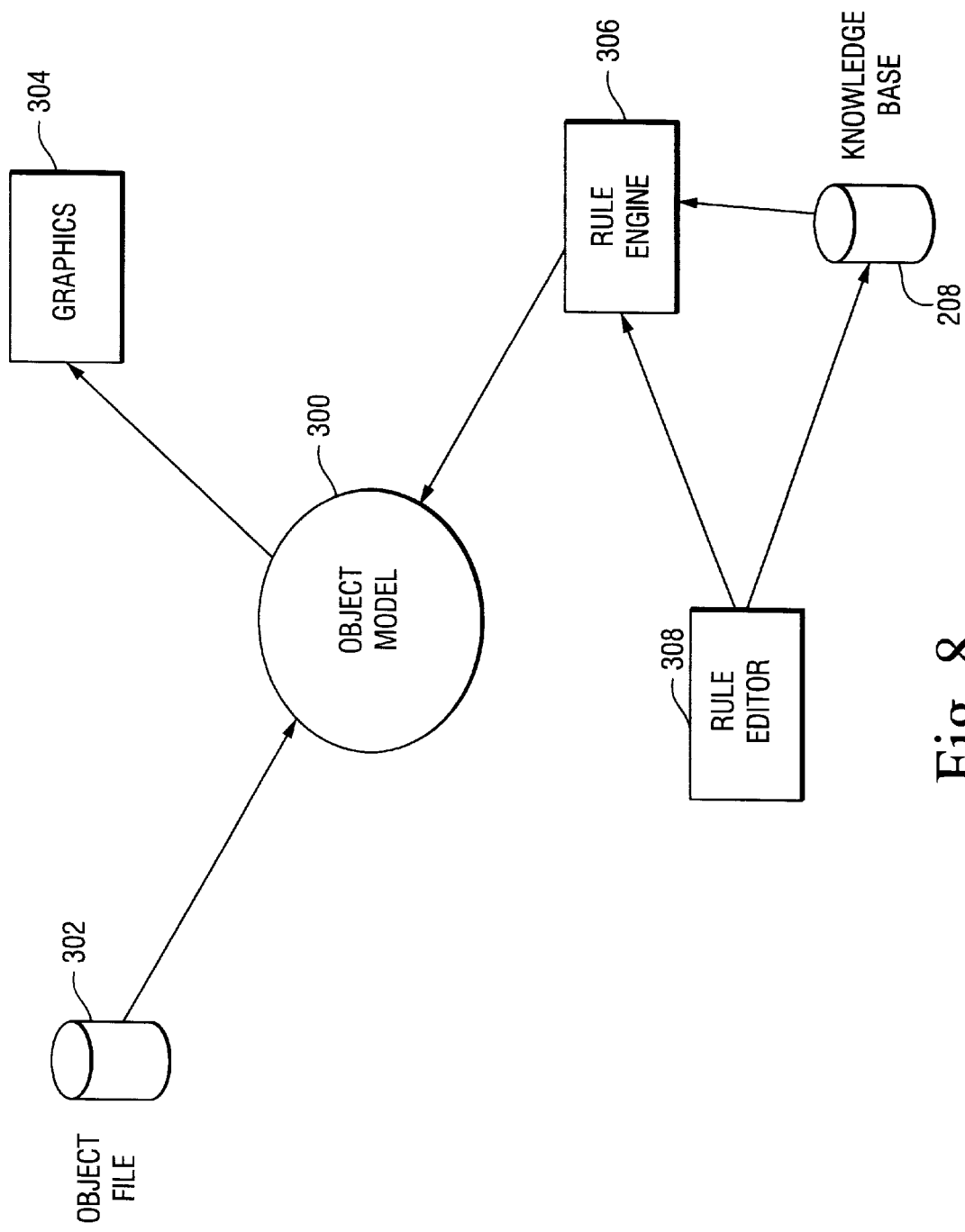
FIG. 8 illustrates schematically the various parts that make up the configurator module of FIG. 1.

The object model is preferably embodied in the Lisp programming language. The current implementation runs using Allegro Common Lisp for Windows Version 3.01, supplied by Franz Inc. The use of a language such as Lisp, allows the user full access to the entire language function set via the rule editor 308 (FIG. 8). In addition, the preferred embodiment provides the user with an extensive list of additional functions, as follows:

| Configurator Function Summary | |
| --- | --- |
| display-value attribute attribute . . . | show-attribute-names |
| call 'code-block' | add-value attribute value [quantity] [instance] |
| remove-value attribute value [quantity] | get-value attribute [instance] |
| ensure-value attribute value instance | set-value attribute value [instance] |
| increment-value attribute [value] | decrement-value attribute [value] |
| clear-value attributes instance | ask-user-for-values attributes |
| connected-to symbol-name [attribute-value pairs] | connections-to symbols [attribute-value pairs] |
| equal-to attribute value | member-of attribute value |
| occurences-of attribute value | union-of list list |
| intersect-of list list | between-values low high value |
| condition-value | sum-values attribute |
| set-symbol-ref name | string-to-number string |
| number-to-string number | msgbox message |
| get-option attribute [diagram] | get-attributes-from-nested-diagrams attribute attribute |
| check-for-dangling-end-points | get-symbols [attribute value] |
| select-symbol instance | select-line-thickness |
| select-line-colour | select-line-style |

The additional functions currently defined are:

display-value attributes
  Display the value of the specified attributes on the diagram.
show-attribute-names
  Shows the attribute names on the diagram.
call code-block
  Call the specified code-block defined in the code section of the library.
add-value attribute value [quantity] [instance]
  Add the value to the specified attribute of the symbol quantity times. If quantity is omitted it defaults to 1.
  Creates and appends to lists. The function makes the attribute in to a list if it is not one already.
remove-value attribute value [quantity]
  Remove the value from the specified attribute of the symbol quantity times.
  The quantity attribute is optional. If omitted, all occurrences of value will be removed.
  Removes from lists. The function makes the attribute in to a list if it is not one already.
get-value attribute instance
  Returns the value of the specified attribute of the instance.
  The instance part is optional and, if not specified, is assumed to be the current symbol.
  Returns attribute values of any form.
ensure-value attribute value instance
  Add the value to the specified attribute of the instance only if it is not there already.
  The instance part is optional and, if not specified, is assumed to be the current symbol.
set-value attribute value instance
  Set the specified attribute of the instance to be value.
  The instance part is optional and, if not specified, is assumed to be the current symbol.
  Value can be any form (i.e. a list, a string, a number)
Increment-value attribute [value]
  Increment the value of the attribute by 1, or supplied value.
decrement-value attribute [value]
  Decrement the value of the attribute by 1, or supplied value.
clear-value attributes instance
  Clear the values of the specified attributes of the instance.
  The instance part is optional and, if not specified, is assumed to be the current symbol.
ask-user-for-values attributes
  Provides a dialog box enabling the user to input values for the specified attributes.
connected-to symbol-name (attribute-value pairs)
  Returns a list of all the symbols with the specified name that the symbol is connected to.
  If the optional attribute-value pairs are included then the function will return a list of all the symbols of the specified name, containing attributes of the specified values, that the symbol is connected to. It is also possible to use a function in the value field.

e.g. To find if a symbol is connected to a symbol called "WAN" with a service of "SMDS" and a speed greater than or equal to 4M, the following code could be used:
(connected-to "WAN" 'service "SMDS" 'nspeed '(>= 4000000))

connections-to list-of-symbols (attribute-value pairs)

allows access to the properties for the connection objects between symbols.

E.g.
(connections-to
    (connected-to "WAN" 'service "SMDS")
    'bandwidth '(>=1024)
)

Will return a list of all SMDS wans that have connections of 1M or greater.

equal-to attribute value

Is the attribute set to the specified value?

Works on single values such as strings or numbers.

member-of attribute value

Does the attribute contain the specified value?

Works on lists only.

occurrences-of attribute value

How many occurrences of the specified value are there in the attribute?

Works on lists only.

e.g. (occurrences-of 'parts "abc")

This will return a count of the number of "abc" items in the parts attribute union-of list list . . .

Returns a list of all the items contained within arguments.

The arguments must be lists.

e.g. (union-of '(1 2 3 4) '(5 3 6 4)) is (1 2 3 4 5 3 6 4)

intersect-of list list . . .

Returns a list of the items that are common across all of the arguments.

The arguments must be lists.

e.g. (intersect-of '(1 2 3 4) '(5 3 6 4)) is (3 4)

between-values low high value

Does the value occur between low and high inclusive?

e.g. (between-values 4 8 6) is true
    (between-values 4 8 8) is true
    (between-values 4 8 4) is true
    (between-values 4 8 3) is false
    (between-values 4 8 9) is false condition-value Evaluates the condition part of a rule.

This is useful when the condition returns a value that is needed for use in the consequence.

e.g.

If the rule was to fire when the symbol was connected to ethernet of type 10-Base-T, the condition would be:
(connected-to-with "ethernet" 'type "10-Base-T")

If this condition is true, it may then be required to add a patch cord for each 10-Base-T connection.

This could be done by repeating the condition within the conclusion as follows:
    (add-value 'parts "Patch Cord" (length (connected-to-with "ethernet" 'type "10-Base-T")))

An easier way is to use condition-value as follows:
    (add-value 'parts "Patch Cord" (length (condition-value)))

sum-values attribute

Provides a mechanism to accumulate all values of a particular attribute across a diagram independent of connectivity.

i.e. (set-value 'total-widgets (sum-values 'widgets))

If a symbol has a list of values, '(4 2 6) these will all be summed to add to the total value, i.e. 12.

set-symbol-ref name

This function provides a means of dynamically changing the representation of the symbol on the screen and also swapping out the rule set being used. This enable rules to be partitioned across various symbols rather than having a single symbol containing all of the rules.

If a router type is chosen due to its connectivity then the actual configuration of the router can be encapsulated in the rules for the specific router type.

i.e.

```
(symbol
    (name "router")
    (metafile "router.wmf")
    (protocol (one-of ip ipx))
    (rules (
        (rule "EthernetRouter" (= 1 (length (connected-to "ethernet")))
            (set-symbol-ref "Ethernet Router"))
        (rule "TokenRingRouter" (= 1 (length (connected-to "token ring")))
            (set-symbol-ref "Token Ring Router"))
    ))
)
```

The rules above select which type of router is appropriate. If it is attached to a single ethernet LAN then the "Ethernet Router" is selected or for a single token ring the "Token Ring Router" is selected (no checking is provided in this case for any other valid or invalid connectivity).

i.e.

```
(symbol
    (name "Ethernet Router")
    (metafile "e-router.wmf")
    (protocol (one-of ip ipx))
    (rules (
        (rule "IPEthernetProtocols" (equal-to 'protocol 'ip)
            (set 'IOS "IP stack for Ethernet Router"))
        (rule "IPXEthernetProtocols" (equal-to 'protocol 'ipx)
            (set 'IOS "IPX stack for Ethernet Router"))
    ))
)
```

A similar definition applies to the Token Ring Router symbol thereby splitting functionality across three different symbols. The symbol keeps a reference to the type of symbol that was initially placed however and can therefore return the symbol to its original form during the first pass of the configuration process.

string-to-number string

Converts a string of the form "256 kbps" to 256000. The only supported conversions in Alpha2 are "k" and "M".

number-to-string number

Converts number to a string.

msgbox message

Displays a dialog box on the screen containing message.

This is useful to include in rule conclusions for debugging.

e.g. (msgbox (get-value 'router))

could be used to display the value of the router attribute of the symbol at a particular instance during configuration or (msgbox "Symbol changed to C7000")

could be used to indicate that a particular conclusion has been evaluated.

get-option attribute [diagram]

Returns the value of the specified option.

get-attributes-from-nested-diagrams attribute attribute . . .

Is useful to use in the preconfigure block to bring attribute values from a lower level linked diagram up to the current level.

i.e. (preconfigure
(get-attributes-from-nested-diagrams 'widgets 'terminals)
)

check-for-dangling-end-points

Is useful to use in the postconfigure block to check the diagram for any connections that may have unconnected end points.

delete-dangling-end-points as above but deleteing unconnected lines without asking.

get-symbols [attributable value]

returns a list of all symbols with the specified attribute value pairs.

select-symbol instance selects the specified symbol, adding grab handles to it for highlighting.

select-line-thickness

Changes the displayed width of a connection.

select-line-colour

Changes the displayed colour of a connection.

select-line-style

Changes the displayed style of a connection. May be :dot :dash or :solid.

some useful Lisp programming language functions are:

Note: in Lisp terms, nil is FALSE and t, or any non-nil value, is TRUE.

Configurator may also use yes and no for true and false respectively.

length sequence

Returns the length of the sequence.

e.g. To count the number of connections the symbol has to another symbol called "ethernet":

(length (connected-to "ethernet"))

setq name value

Sets name to be equal to value.

e.g. To set a variable called count to be equal to the number of connections the symbol has to another symbol called "ethernet":

(setq count (length (connected-to "ethernet")))

=numbers

Returns true if all numbers are equal.

e.g. To see if a symbol has 3 connections to another symbol called "ethernet":

(=3 (length (connected-to "ethernet")))

l=numbers

Returns true if all numbers are different (l=→not equal)

>number1 number2

Returns true if number1 is greater than number2.

<number1 number2

Returns true if number 1 is less than number2.

>=number1 number2

Returns true if number1 is greater than or equal to number2.

<=number1 number2

Returns true if number1 is less than or equal to number2.

+numbers

Returns the sum of numbers.

−number1 number2

Returns the result of number1 minus number2.

* numbers

Returns the product of numbers l number1 and number2

Returns the result of number1 divided by number2

The result may be a fractional number such a $13/3$ which may be converted into a decimal number by using the 'float' function. i.e. (float(/ 13 3))

and conditions

Returns true if all conditions are true.

e.g. To check that the symbol has 1 connection to another symbol called "ethernet" and 2 connections to another symbol called "token ring":

(and (=1 (length (connected-to "ethernet"))
(=2 (length (connected-to "token ring"))))

or conditions

Returns true if one of the conditions is true.

e.g. To check whether a symbol is connected to another symbol called "ethernet" or one called "token ring":

(or (connected-to "ethernet")
(connected-to "token ring"))

not condition

Returns true if the condition is false.

e.g. To check that a symbol is not connected to another symbol called "ethernet":

(not (connected-to "ethernet"))

dolist (variable list) {form}

The first element of list is bound to variable and form is evaluated. Variable is then bound to the second element of list and form is evaluated. This process continues until all elements in list have been evaluated within form.

e.g.

```
(rule "test" (intersect-of
        (connected-to "ethernet")
        (connected-to "token ring"))
    (dolist (instance (condition-value))
        (add value 'eth/tr instance)
    )
)
```

The condition of this rule returns a list of symbols that are connected to both ethernet and token ring. If such a list is returned, then the conclusion will be evaluated. This simply iterates around the list returned by the condition and adds each of the symbols in the list to an attribute called eth/tr.

cond (test form)

Similar to a 'case' statement in other languages. If test is true then form is evaluated. The (test form) partnerships can be nested. This is best described by way of an example rule:

```
(rule "ETHConnections" (connected-to "ethernet")
    ;; how may ethernets are we connected to?
    (setq count (length (condition-value)))
    (cond ((> = count 4)
        (set-value 'connections "4 or more, connections to ethernet")
            (add-value 'parts "connectors" count))
        ((= count 3)
        (set-value 'connections "3 connections to ethernet")
            (add-value 'parts "connectors" count))
        ((= count 2)
```

```
        (set-value 'connections "2 connections to ethernet")
            (add-value 'parts "connectors" count))
        ((= count 1)
        (set-value 'connections "1 connection to ethernet")
            (add-value 'parts "connectors"))
        (t
            (set-value 'connections "no connections to ethernet"))
    ) ;;; end of cond
) ;;; end of rule
```

The condition of the rule checks to see if the symbol is connected to a symbol called "ethernet". On finding the condition to be true, the consequent part of the rule will be evaluated. The first part of the consequent sets a variable called count to be equal to the number of connections the symbol has to one called "ethernet" (remember condition-value evaluates the condition part of the rule). The second part of the consequent is a cond clause containing 5 possible outcomes.

Firstly count is examined to see if it is greater or equal to 4 and if it is then an attribute called 'connections' is set to "4 or more connections to ethernet" and the number of connectors is added to the 'parts' attribute.

Once one of the conditions of a cond clause has been met, then none of the others are evaluated and the clause is exited. If count is not equal to 4, then the next test is evaluated (i.e. is count equal to 3?) and so on. If none of the tests for count apply then the default condition, 't', will have its forms evaluated. If the 't' condition is omitted from a cond clause and none of the other tests apply, then nothing is evaluated.

Once the network has been fully designed and configured, the configurator module 12 (FIG. 1) outputs its results to the pricing and reports modules 16. Since each symbol object has a "parts" attribute, any items added to that attribute will be interpreted as item part codes. These codes may then be used to look up the relevant information in the pricing database 210. In addition, a report showing the parts list can be viewed and printed.

What is claimed is:

1. A method of configuring a computer network having a predetermined topology said method comprising
    (a) selecting a plurality of symbol objects, each symbol object being an object-based computer representation, having settable attributes, of a physical element in a computer network;
    (b) defining associations between the selected symbol objects to produce an initial network configuration;
    (c) applying at least one rule from a predefined set of rules to the selected symbol objects in the initial network configuration, the rules in said set being arranged to alter the settable attributes of symbol objects dependent upon predefined rule conditions, thereby automatically selecting specific hardware for the physical elements and updating the network configuration; and
    (d) repeating (c) using, at each repetition, the updated network configuration arising from the immediately preceding application of (c) in place of the initial network configuration until the updated network configuration becomes substantially stable from one repetition to the next.

2. A method as in claim 1 in which a specific piece of physical hardware, from a specific manufacturer, is represented by a specific symbol object having specific predefined values for the settable attributes.

3. A method as in claim 1 in which the symbol objects are presented by display icons, the selection of symbol objects and the defining of associations being effected by on-screen manipulation of the display icons.

4. A method as in claim 1 in which each predefined rule consists of a rule condition portion and a rule conclusion portion, the rule conclusion portion defining an action to be taken in dependence upon a test applied to the rule condition portion.

5. A method as in claim 4 in which in (c) the initial configuration is first parsed by testing the rule condition portion of each rule in said set for each selected symbol object, and an agenda list of rules and corresponding objects is constructed for which the test was positive, and wherein said at least one rule being applied at (c) is selected from said agenda list of rules.

6. A method as in claim 5 in which c further includes sequentially visiting each rule in the agenda list, testing its rule condition portion again and, if the test is again positive, effecting the action defined by the rule conclusion portion.

7. A method as in claim 4 in which in (d) the updated configuration is first parsed by testing the rule condition portion of each rule in said set for each selected symbol object, and an agenda list of rules and corresponding objects is constructed for which the test was positive, and wherein said at least one rule being applied at (c) is selected from said agenda list of rules.

8. A method as in claim 4 in which (d) further includes sequentially visiting each rule in the agenda list, testing its rule condition portion again and, if the test is again positive, effecting the actions defined by the rule conclusion portion.

9. A method as in claim 1, including defining diagram objects, each diagram object defining a group of symbol objects representative of a portion of a computer network.

10. A method as in claim 9 in which the group is representative of a computer network.

11. A method as in claim 9 in which the group is representative of a WAN.

12. A method as in claim 9 including defining a first diagram object defining a group of symbols representative of a WAN, and a second diagram object defining a group of symbols representative of a LAN, a site object within the first diagram object being associated with the second diagram object.

13. A method as in claim 12 in which the user displays the second diagram object by selecting on screen an icon representative of the site object.

14. A method as in claim 12 in which WAN cloud object within the second drawing object is associatable with the site object thereby specifying a connection between the WAN and the LAN.

15. A method as in claim 1 in which a change in settable attributes, consequent upon application of the rules, is reflected by a change in a screen display.

16. A method as in claim 15 in which:
    the symbol objects are represented by display icons, the selection of symbol objects and the defining of associations being effected by on-screen manipulation of the display icons; and
    the display icon of a symbol object changes in dependence upon the settable attributes of that object.

17. A method as in claim 3 in which the values of at least some of the settable attributes for a symbol object are displayed on screen in association with the corresponding icon.

18. A method as in claim 1, in which the rules are Lisp-compatible, or compatible with a superset thereof.

19. A method as in claim 1 in which:
    a specific piece of physical hardware, from a specific manufacturer, is represented by a specific symbol object having specific predefined values for the settable attributes; and including a user-selectable conflict resolution method to prevent looping.

20. A method as in claim 19 in which:

a specific piece of physical hardware, from a specific manufacturer, is represented by a specific symbol object having specific predefined values for the settable attributes;

in (c) the initial configuration is first parsed by testing the rule condition portion of each rule in said set for each selected symbol object, and an agenda list of rules and corresponding objects is constructed for which the test was positive, and wherein said at least one rule being applied at (c) is selected from said agenda list of rules, and the conflict resolution method includes selecting rules from the agenda list in reverse order.

21. A method as in claim 19 in which:

a specific piece of physical hardware, from a specific manufacturer, is represented by a specific symbol object having specific predefined values for the settable attributes;

in c the initial configuration is first parsed by testing the rule condition portion of each rule in said set for each selected symbol object, and an agenda list of rules and corresponding objects in constructed for which the test was positive, and wherein said at least one rule being applied at (c) is selected from said agenda list of rules; and the conflict resolution method includes selecting only the first rule in the agenda list, or the last rule, and discarding the rest.

* * * * *